(12) United States Patent
Abe et al.

(10) Patent No.: US 6,356,709 B1
(45) Date of Patent: Mar. 12, 2002

(54) DEVICE, METHOD, AND MEDIUM FOR RECORDING STILL PICTURE AND ANIMATION

(75) Inventors: Miki Abe, Kanagawa; Eiichiro Morinaga, Tokyo; Takayasu Kon, Kanagawa; Takafumi Hosoi, Saitama, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/066,399

(22) PCT Filed: Aug. 21, 1997

(86) PCT No.: PCT/JP97/02911

§ 371 Date: Nov. 16, 1998

§ 102(e) Date: Nov. 16, 1998

(87) PCT Pub. No.: WO98/09436

PCT Pub. Date: Mar. 5, 1998

(30) Foreign Application Priority Data

Aug. 30, 1996 (JP) ............................................. 8-231060
Aug. 30, 1996 (JP) ............................................. 8-231061

(51) Int. Cl.[7] ............................................... H04N 5/225
(52) U.S. Cl. ........................ 386/117; 386/95; 386/109; 386/121; 348/220; 358/909.1
(58) Field of Search ............................. 386/33, 38, 117, 386/111–112, 120, 121, 109, 95; 358/906, 909.1; 348/220, 231, 232, 233, 390.1, 399.1, 400.1, 452, 465, 387.1; H04N 5/225

(56) References Cited

U.S. PATENT DOCUMENTS

| | | | |
|---|---|---|---|
| 4,768,095 A | 8/1988 | Wada et al. ................. 358/183 |
| 5,103,306 A | * 4/1992 | Weiman et al. .......... 348/400.1 |
| 5,335,016 A | 8/1994 | Nakagawa | |
| 5,412,514 A | * 5/1995 | Kobayashi ................... 386/121 |
| 5,444,482 A | * 8/1995 | Misawa et al. .............. 348/220 |
| 5,481,543 A | * 1/1996 | Veltman ...................... 348/465 |
| 5,576,757 A | * 11/1996 | Roberts et al. ............. 348/220 |
| 5,579,054 A | * 11/1996 | Sezan et al. ................. 348/452 |
| 5,706,097 A | * 1/1998 | Schelling et al. ........ 358/909.1 |
| 5,715,176 A | * 2/1998 | Mobini ......................... 386/96 |
| 5,982,984 A | * 11/1999 | Inuiya ........................ 386/121 |
| 6,011,901 A | * 1/2000 | Kristen ........................ 386/109 |

FOREIGN PATENT DOCUMENTS

| | | | | |
|---|---|---|---|---|
| EP | 0 411 906 | 2/1991 | | |
| EP | 0 619 678 A2 | 10/1994 | | |
| GB | 2 211 048 | 6/1989 | | |
| JP | 6-276470 | 9/1994 | | |
| JP | 7-264530 | 10/1995 | | |
| JP | 7-284058 | 10/1995 | | |
| JP | 07284058 A | * 10/1995 | ............ H04N/5/92 |
| JP | 8-205086 | 8/1996 | | |

* cited by examiner

Primary Examiner—Vincent F. Boccio
(74) Attorney, Agent, or Firm—Frommer Lawrence & Haug LLP; William S. Frommer (57) ABSTRACT

Picture signals entering a picture input device 4 are compressed by a picture compression device 5 for storing the resulting compressed picture data in a secondary storage device 7 via a primary storage device 6. The picture compression system is switched for recording a moving picture and for recording a still picture by switching picture compression parameters of the picture compression device 5 by a picture compression system switching device 10 between those for moving picture recording and those for still picture recording.

2 Claims, 4 Drawing Sheets

DEVICE, METHOD, AND MEDIUM FOR RECORDING STILL PICTURE AND ANIMATION

TECHNICAL FIELD

This invention relates to an apparatus and a method for recording moving pictures and still pictures using a general-purpose standard for encoding moving pictures, such as MPEG2, and a recording medium having moving and still pictures recorded thereon.

BACKGROUND ART

In Japanese Laying-Open patent Publication 3-34686, there is disclosed a digital still picture signal recording/reproducing device in which, as moving picture signals are recorded, desired still picture signals are selected from video camera output signals and recorded in a digital memory, such as RAM, and in which signals sequentially read out from the digital memory are divided into plural tracks for recording on a digital speech recording/reproducing device.

In the digital still picture signal recording/reproducing device, the digitally-recorded still picture signals are recorded along with identification signals specifying that the digitized still picture signals are signals other than speech signals, for demarcating the digitally-recorded still picture signals from the digital speech signals.

In the Japanese Laying-Open Patent publication 5-36205, there is disclosed a magnetic recording device in which moving pictures can be imaged even during timer operation on the occasion of imaging a still picture using a timer.

In the Japanese Laying-Open Patent publication 5-115053, there is disclosed a magnetic recording device in which a specified one of contiguous analog moving pictures is recorded as still picture signals in a still picture recording area and the still picture is also continuously recorded in the moving picture recording area for enabling comprehension of the contents of the recorded still picture at the time of reproduction of the moving picture.

In the Japanese Laying-Open Patent publication 7-193777, there is disclosed a video camera capable of simultaneously recording the moving picture and the still picture in which, if recording release mode is selected during recording of the still picture signals, the recording picture release mode is executed after completely recording the still picture signals for not allowing incomplete still picture to be left.

Meanwhile, in a conventional device for recording both the moving and the still picture, the moving picturers are recorded as analog signals on a magnetic tape, whilst the still picture is recorded as PCMed digital signals in a digital signal recording area. Thus, two channels of the signal processing circuits, namely an analog signal processing circuit for recording moving pictures and a digital signal processing circuit for recording still pictures, are required, thus complicating the device structure. For reproducing the recorded moving and still pictures, two reproducing circuits for coping with the two recording systems are required.

If a still picture is imaged during recording the moving pictures, the same scene is recorded in duplicates by analog and digital signals. If only a still picture is recorded, an analog signal recording area for a moving picture is not used. In such case, the recording capacity of the recording medium, such as a magnetic tape, is not utilized effectively.

Moreover, if a still picture is imaged during recording of moving pictures, the digital signals of the imaged still picture are recorded in the speech signal recording area, so that, during recording of digital signals of the still picture, speech recording is interrupted.

Thus it may be contemplated to record on the recording medium the moving picture and the still picture by the compression system for moving pictures and by the compression system for still pictures, respectively using such as MPEG standard, in order to make common use of the recording device for recording the moving picture and for recording the moving picture for enabling effective utilization of the recording capacity of the recording medium as well as preventing interruption of speech recording.

However, with the structure of simply recording compressed data for moving pictures and that for still pictures, it becomes difficult to selectively record only still pictures.

For overcoming the above drawback, it is an object of the present invention to provide a still/moving picture recording apparatus and a still/moving picture recording method in which a common hardware structure is used for recording moving pictures and still pictures and in which effective utilization can be made of the recording capacity of the recording medium even in case moving pictures are recorded together with a still picture, and a recording medium for still and moving pictures having recorded thereon the moving pictures together with still pictures.

It is another object of the present invention to provide an apparatus and a method and a recording medium for moving/still pictures for enabling only the still picture data to be selected and reproduced.

DISCLOSURE OF THE INVENTION

The still/moving picture recording apparatus according to the present invention includes picture compressing means for compressing input picture signals for conversion to picture data, recording means for recording the picture data outputted by the picture compressing means on a recording medium and picture compression system switching means for switching the picture compression parameters of the picture compression means between those for moving picture recording and those for still picture recording for switching the picture compression system. With the above picture compression system switching means, the compression system is preferably switched for still picture recording to an intra-frame encoding (I-picture) or to forward predictive encoding (P-picture). Also, with the still/moving picture recording apparatus according to the present invention, the picture compression system is automatically switched between that for moving picture recording and that for still picture recording for recording compressed picture data on the recording medium.

The still/moving picture recording apparatus according to the present invention includes picture compression means for generating, for the moving picture recording mode, picture data compressed based on the compression parameters for moving picture recording, and for generating, for the still picture recording mode, compressed picture data compressed based on compression parameters for still picture recording, and recording means for recording picture data generated by the picture compression means on an exchangeable recording medium. Picture data inclusive of the still picture recording mode information specifying that the picture is a still picture is recorded on the recording medium for the still picture recording mode. The still picture recording mode information specifying that the picture recorded is the still picture may be such information in which the quantization coefficient of the first macro-block of picture data compression-encoded in accordance with the MPEG standard is fixed at a specified value. The compression parameters for still picture are set in meeting with for example the magnitude of the motion vector or the input picture position.

In the still/moving picture recording method wherein picture compression parameters are switched between those for moving picture recording and those for still picture recording, input picture signals are converted into compressed picture data by a picture compression system different between one for moving picture recording and one for still picture recording, and the compressed picture data is recorded on a recording medium. With the still/moving recording method, the picture compression system is switched during still picture recording to intra-picture encoding or to forward predictive encoding for converting the input picture signals to compressed picture data which is recorded on the recording medium.

In the still picture recording method according to the present invention, picture data compressed based on compression parameters for moving picture recording is generated for a moving picture recording mode for recording on a recording medium and picture data compressed based on compression parameters for still picture recording is generated for a still picture recording mode for recording on the recording medium along with the still picture recording mode information specifying that the picture recorded in a still picture. With the present still/moving picture recording method, the compression parameters for still picture provide that, in compression encoding by MPEG as a standard for encoding, the quantization coefficient of the initial macro-block of picture data be fixed at a pre-set specified value, and the information in which the quantization coefficient of the initial macro-block of picture data is fixed at a pre-set specified value is used as the still picture recording mode information. The compression parameters for still picture are set in meeting with for example the magnitude of the motion vector or the input picture position.

The still/moving picture recording medium according to the present invention has a moving picture recording area and a still picture recording area having recorded therein compressed picture data obtained by switching the picture compression parameters for converting input picture signals by picture compression systems different for moving picture recording and for still picture recording.

The still/moving picture recording medium according to the present invention has a moving picture recording area and a still picture recording area. The moving picture recording area has recorded therein picture data compressed based on compression parameters for moving picture recording while the still picture recording area has recorded therein picture data compressed based on compression parameters for still picture recording as well as the still picture recording mode information specifying that the picture data recorded is a still picture.

BEST MODE FOR CARRYING OUT THE INVENTION

Referring to the drawings, preferred embodiments of the present invention will be explained in detail.

Figure 1:
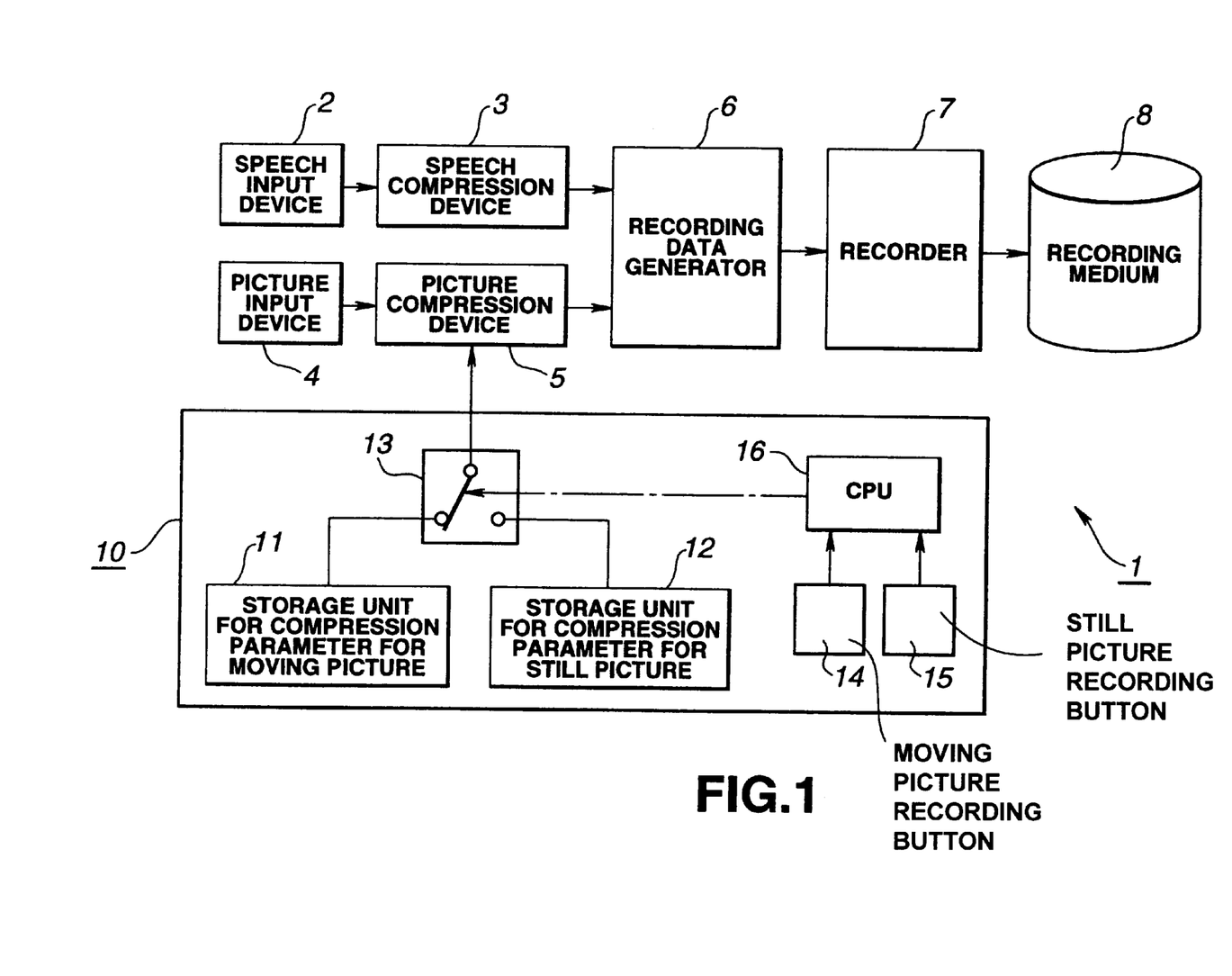
FIG. 1 is a block diagram showing an illustrative structure of a still/moving picture recording device according to the present invention.

The still/moving picture recording device according to the present invention is configured as shown for example in the block diagram of FIG. 1.

A still/moving picture recording device shown in FIG. 1 includes a speech input device 2, a speech compression device 3, as a speech processing device, for converting an input speech signal outputted by the speech input device 2 into speech data, a speech input device 4, a picture compression device 5 for compressing picture data outputted by the speech input device 4 for conversion to picture data, a recording data generating device 6 for transiently storing picture data outputted by the speech compression device 3 and picture data outputted by the picture compression device 5, packeting the transiently stored speech data and picture data for generating packet data and for outputting the packet data, a recording device 7 for recording the packet data outputted by the recording data generating device 6 on an exchangeable recording medium 8, and a picture compression system switching device 10 for switching picture compression parameters prescribing the picture compression operating conditions for the picture compression device 5 for recording moving pictures to those for still pictures and vice versa for switching the picture compression systems.

The speech input device 2 includes a microphone and speech signal processing circuit for amplifying speech signals collected by the microphone. The speech compression device 3 includes an encoding circuit for speech for converting the input speech signal into digital signals and subsequently compressing the converted digital signals for outputting speech data. The picture input device 4 includes an imaging optical system, an imaging system, such as CCD, and a picture signal processing circuit for performing various analog signal processing operations on the imaged picture signals.

The picture compression device 5 includes an encoding circuit for MPEG2, as an example. The picture compression device 5 is designed for compressing a picture under picture compressing conditions designated by the compression parameters supplied from the picture compression system switching device 10.

The recording data generating device 6 includes a memory for transient storage of speech data and picture data and a data processing circuit for packeting the transiently stored data.

The recording device 7 has a recording medium loading unit for loading exchangeable recording mediums, such as tapes, discs or memory cards, and a recording circuit for recording packet data on the loaded recording medium. The recording device 7 records packet data furnished by the recording data generating unit 6 on the exchangeable recording mediums 8.

The picture compression system changeover device 10 includes a compression parameter storage unit 11 for moving pictures, having stored therein compression parameters for recording moving pictures, a compression parameter storage unit 12 for still pictures, having stored therein compression parameters for recording still pictures, a parameter selection circuit 13 for selecting parameters supplied to the picture compression device 5, and a CPU 16 for monitoring the operating states of a moving picture recording button 14 and a still picture recording button 15 for determining the recording mode and for controlling the selective switching operation of the parameter selecting circuit 13 based on the selected recording mode so that the compression parameters for recording moving pictures and those for recording still pictures will be supplied to the picture compression device 5 during recording of the moving pictures and during recording of the still pictures, respectively.

The compression parameters for moving pictures prescribe the compression ratio larger than those for still pictures. The compression parameters for moving pictures permit all of the three sorts of encoding of intra-coded frames (I-pictures), forward predictive encoding (P-pictures) and bidirectional predictive coding (B-frames). The compression parameters for moving pictures are set at the time of generating the picture compression data for moving pictures so that the quantization coefficients of the initial macro-block will be other than 1.

The compression parameters for still pictures prescribe the compression ratio smaller than those for moving pictures. The compression parameters for moving pictures are basically intended for intra-coded frames (I-pictures) on the condition that, if still picture recording is requested consecutively within a pre-set time, picture encoding may be carried out by forward predictive encoding (P-pictures). When compressed picture data for still pictures is generated, the quantization coefficient of the first macro-block of the compressed parameters for still pictures is set to unity (1).

If the recording button for recording 14 is pressed down, the CPU 16 judges the mode to be that for recording moving pictures and controls the parameter selecting button 13 to supply the compressed parameters for recording moving pictures to the picture compression device 5. If the moving picture recording button 14 continues to be pressed down, the CPU 16 continues the recording of moving pictures.

If the still picture recording button 15 is pressed down, the CPU 16 judges the mode to be that for recording still pictures and controls the parameter selecting button 13 to supply the compressed parameters for recording still pictures to the picture compression device 5. At a time point a one-frame still picture has been recorded as from a time point of detecting the pressing of the still picture recording button 15, the CPU 16 causes the still picture recording mode to be terminated. The arrangement may be so made that, during the time the still picture recording button 15 is pressed down, the still picture recording will be continued for the number of frames per unit time which is the same as or lesser than the moving picture recording time. That is, during the time the still picture recording button 15 is pressed down, still pictures continue to be recorded at a rate of 1 to 30 frames per second.

If, during the time the moving picture recording button 14 is pressed down such that the recording is going on under the moving picture recording mode, the still picture recording button 15 is pressed down, the CPU 16 switches the picture compression parameters from those for the moving picture to those for the still picture for one frame period. The CPU 16 may be configured so that the still picture recording mode will be continued during the time of pressing of the still picture recording button 15.

The picture compression device 5 compresses the input picture signals, based on the picture compression parameters supplied from the picture compression system switching device 10, for converting the input picture signals into picture data. When generating picture compression data for still pictures based in the compression parameters for recording still pictures, the picture compression device 5 sets the quantization coefficient of the first macro-block to unity (1). When generating picture compression data for still pictures based on the compression parameters for recording still pictures, the picture compression device 5 sets the quantization coefficient of the first macro-block to other than unity (1).

By recording on the recording medium whether or not recording has been done in the still picture recording mode or in the moving picture recording mode, depending on whether or not the quantization coefficient of the initial macro-block is set to 1, it becomes possible to automatically select and reproduce only the still picture data during reproduction.

The operation of the still/moving picture recording device 1 according to the present invention will hereinafter be explained. On pressing the moving picture recording button 14, the CPU 16 in the picture compression system switching device 10 judges the mode to be the moving picture recording mode and furnishes the compression parameters for recording moving pictures to the picture compression device 5. Based on the compression parameters for recording moving pictures, the picture compression device 5 compresses the input picture for outputting the compressed picture data. The recording data generating device 6 packets speech data outputted by the speech compression device 3 and picture data outputted by the picture compression device 5 to supply the packeted data to the recording device 7. The recording device 7 records the packet data on an exchangeable recording medium 8, such as a tape, disc or a memory card. This effects recording of moving pictures.

If the still picture recording button 15 is pressed, the CPU 16 in the picture compression system switching device 10 judges the mode to be a still picture recording mode, and furnishes the compression parameters for recording still pictures to the picture compression device 5. Based on the compression parameters for recording still pictures, the picture compression device 5 compresses the input picture for one frame to output the compressed picture data. The compressed one-frame picture data is packeted by the recording data generating device 6 and furnished to the recording device 7 for recording on the exchangeable recording medium 8.

If the still picture recording button 15 is pressed down during the recording of moving pictures, the CPU 16 in the picture compression system device 10 switches the picture compression parameters supplied to the picture compression device 5 from those for moving picture to those for still pictures only during one-frame period. Thus, the picture compression device 5 reverts to the state of compressing the moving pictures after compressing the input picture based on the still picture recording compression parameters for one frame period as from the compressed state for moving pictures. The picture data, sequentially outputted by the picture compression device 5, is packeted by the recording data generating device 6 and thence supplied to the recording device 7 for recording on the exchangeable recording medium 8.

Since only the compression parameters are modified for one frame period of recording still picture, even if the still picture is recorded during recording the moving pictures, but the series of moving picture recording operations are not discontinued so that still picture can be recorded without interrupting the recording of moving pictures. Consequently, the speech recording is not interrupted during recording of the moving pictures. Moreover, if the moving and still pictures are recorded simultaneously, the moving and still pictures are not recorded in separate areas, but simply the compression system for one-frame picture is modified for recording the one-frame still picture, so that the recording capacity of the recording medium can be exploited effectively without wastage. Also, since the one-frame input picture is recorded in the still picture recording mode with a low picture compression ratio as an encoded frame reproducible within the frame itself, such as the intra-frame coded frame (I-picture), a still picture can be recorded to a high picture quality.

In addition, since the present still picture recording device 1 records on the recording medium data indicating whether the recording is by the still picture recording mode or by the moving picture recording mode depending on whether or not the quantization coefficient of the initial macro-block of picture data is fixed at 1, it becomes possible to select and reproduce only the still picture data automatically. That is, the recording medium 8 having recorded thereon still and moving pictures in a commingled state by the above-described still/moving picture recording device 1, is a still/moving picture recording medium having a moving picture recording area having recorded therein compressed picture data compressed based on the compression parameters for recording moving pictures and a still/moving picture recording area having recorded therein compressed picture data compressed based on the compression parameters for recording still pictures along with the still picture recording mode information specifying that the compressed picture data are those for a still picture.

In the configuration of FIG. 1, the picture compression system switching device 10 has the compression parameters for recording moving pictures and those for recording a still picture and the compression parameters conforming to the recording mode are supplied from the picture compression system switching device 10 to the picture compression device 5. However, an arrangement may also be made so that compression parameters for recording moving pictures and those for recording still pictures are provided on the side of the picture compression device 5 and so that a recording mode command indicating whether the recording mode is that for the moving pictures or that for the still picture is supplied from the picture compression system switching device 10 to the picture compression device 5 which then switches the picture compression system depending on the supplied recording mode command.

Figure 2:
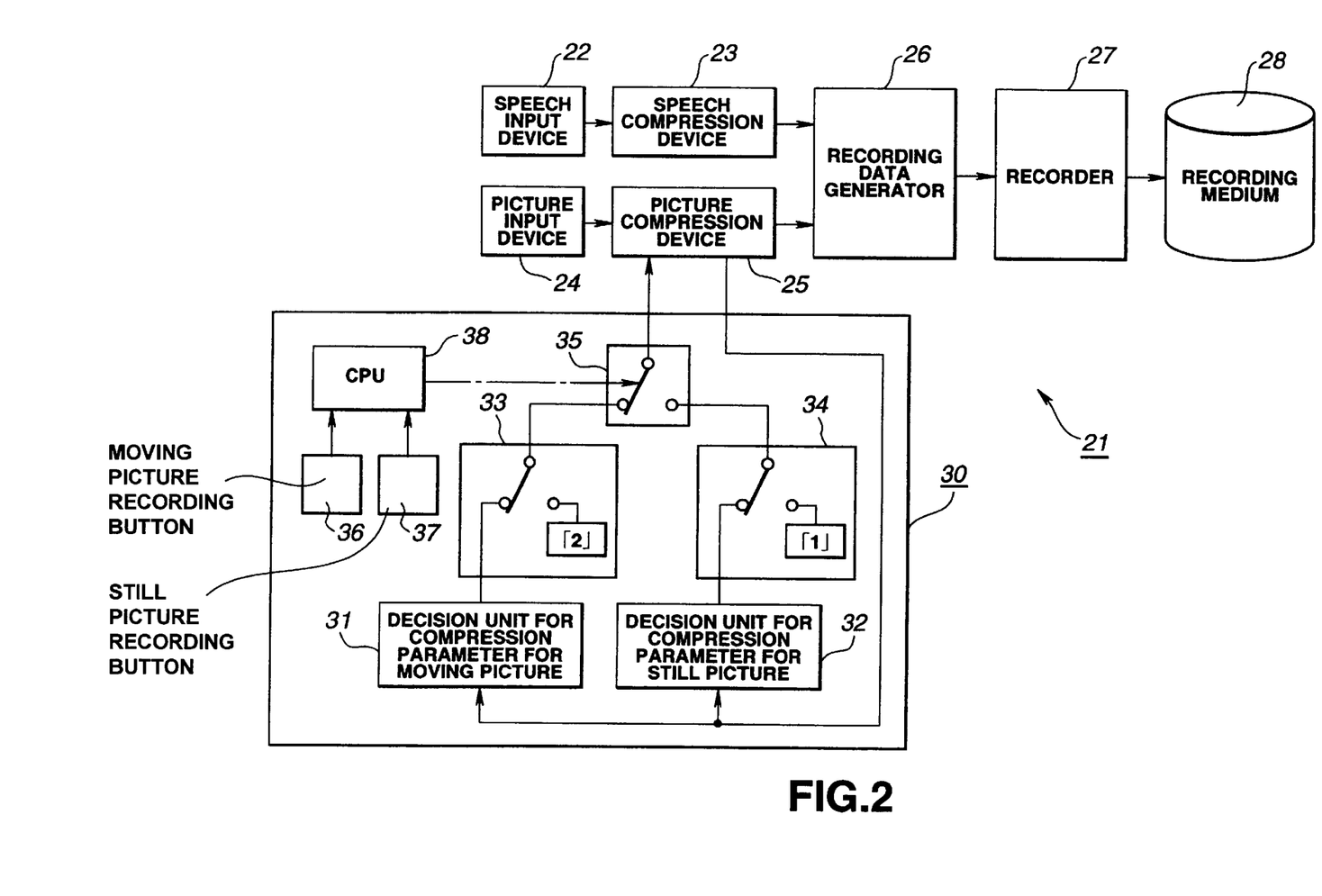
FIG. 2 is a block diagram showing another illustrative structure of a still/moving picture recording device according to the present invention.

A still/moving picture recording device 21, according to the present invention, may be configured as shown for example in FIG. 2.

The still/moving picture recording device 2, shown in FIG. 2, includes a speech input device 22, a speech compression device 23 for converting the input speech signal outputted by the speech input device 22 into speech data, a speech input device 24, a picture compression device 25 for compressing the input picture signals outputted by the picture input device 24 for conversion to picture data, a recording data generating unit 26 for transiently storing speech data outputted by the speech compression device 23 and the picture data outputted by the picture compression device 25 and for packeting the transiently stored speech and picture data to form packeted output data, a recording device 27 for recording packet data supplied by the recording data generating device 26 on the exchangeable recording medium, and a picture compression system switching device 30 for switching the picture compression parameters prescribing the conditions for picture compression operation of the picture compression device 25 between those for the recording of moving pictures and those for recording a still picture for switching the picture compression system.

The speech input device 22 includes a microphone and a speech signal processing circuit for amplifying the speech signals collected by the microphone. The speech compression device 23 includes an encoding circuit for speech adapted for converting the input speech signal into a digital signal and subsequently compressing the digital signal for outputting speech data. The picture input device 24 includes an imaging optical system, an imaging element, such as CCD and a picture signal processing circuit for performing a variety of analog signal processing operations on the imaged picture signals.

The picture compression device 25 includes, for example, an encoding circuit for MPEG2. This picture compression device 25 is configured for compressing a picture under picture compressing conditions specified by the compression parameters suppled from the picture compression system switching device 30.

The recording data generating device 26 includes a memory for transiently storing speech data and picture data and a data processing circuit for packeting the transiently stored speech and picture data.

The storage device 27 includes a recording medium mounting unit for loading the exchangeable recording mediums, such as a tape, disc or a memory card, and a recording circuit for recording packet data in the loaded recording medium. The recording device records packet data supplied from the recording data generating unit 26 on the exchangeable recording medium.

The picture compression system switching device 30 includes a compression parameter decision unit for a moving picture 31 for determining the compression parameter for the moving picture, a compression parameter decision unit for still picture 32 for determining compression parameters for still pictures, a moving picture flag writing unit 33 fed with an output of the compression parameter decision unit for a moving picture 31, a still picture flag writing unit 34 supplied with an output of the compression parameter decision unit for still picture 32, a parameter selection circuit 35 for selecting parameters supplied to the picture compression device 25, and a CPU 38 for monitoring the operating state of the moving picture recording button 36 and the still picture recording button 37 for determining the recording mode and for controlling the selective switching of the parameter selection circuit 35, so that, based on the determined recording mode, the compression parameters for moving picture recording and those for still picture recording will be supplied to the picture compression device 25 during recording the moving and still pictures, respectively.

Based on the generated encoded data volume sent from the picture compression device 25 and on the picture activity, the compression parameter decision unit for a moving picture 31 determines the compression parameters for recording the moving picture. The compression parameters for moving pictures prescribe a compression rate larger than those for still picture. The compression parameters for moving pictures permit encoding of all three types of encoding, that is intra-coded frame (I-picture), forward prediction encoded frame (P-picture) and backward predictive encoded frame (B-picture). The moving picture flag writing unit 11, supplied with the output of the compression parameter decision unit for moving picture 31 compulsorily change the compression parameters for the moving picture to '2' so that the quantization coefficient of the leading macro-block of the picture will be other than '1' for enabling the picture to be identified as the moving picture during reproduction.

The compression parameter decision unit for still picture 32 determines the compression parameters for recording the moving picture based on the data volume from the picture compression device 25 and on picture activity. The compression parameters for still picture prescribe a compression rate smaller than those for still picture. The compression parameters for still picture are basically designed for intra-frame coded frame (I-frame) and allow for picture encoding by the forward predictive-coded frame (P-picture) if recording of still pictures is requested on end in a pre-set time duration. The still picture flag writing unit 34, supplied with the output of the compression parameter decision unit for still picture 34, compulsorily changes the compression parameters for the moving picture to '1' so that the quantization coefficient of the leading macro-block of the picture will be '1' for enabling the picture to be identified as the still picture during reproduction.

If the moving picture recording button 36 is pressed down, the CPU 38 judges the recording mode to be the moving picture recording mode and controls the parameter selection circuit 35 to supply the compression parameters for moving picture recording to the picture compression device 25. The CPU 38 manages control to continue moving picture recording as long as the moving picture recording button 36 remains in the pressed-down state.

If the recording button for still picture 37 is pressed own, the CPU 38 judges the recording mode to be the still picture recording mode and causes the compression parameters for still picture to be supplied via parameter selection circuit 35 to the picture compression device 25. The CPU 38 terminates the still picture recording mode at a time point a one-frame still picture has been recorded as from the time point of detection of pressing down of the still picture recording button 37. The arrangement may be made so that, as long as the still picture recording button 35 is pressed down, still picture recording will be continued with a number of frames per unit time equal to that for moving picture recording or with a number of frames per unit time smaller than that for moving picture recording.

If the still picture recording button 37 is pressed own in the state in which the moving picture recording button 36 is pressed down and the recording is going on with the moving picture recording mode, the CPU 38 switches the compression parameters for one frame from those for moving pictures to those for still pictures. Meanwhile, the CPU 38 may cause the still picture recording mode to be continued as long as the still picture recording button 37 is pressed down.

Based on the picture compression parameters supplied from the picture compression system switching device 30, the picture compression device 25 compresses the input picture signals for conversion to picture data. When generating the picture compression data for still picture based on the compression parameters supplied from the picture compression system switching device 30, the picture compression device 25 sets the quantization coefficient of the first macro-block to '1'. When generating the picture compression data for moving picture based on the compression parameters for moving picture recording, the picture compression device 25 sets the quantization coefficient of the first macro-block to other than '1'.

By recording on the recording medium whether or not recording has been made with the still picture recording mode or with the moving picture recording mode depending on whether the quantization coefficient of the first macro-block has been set to '1', it becomes possible to automatically select and reproduce only the still picture data during reproduction.

The operation of the still/moving picture recording device 21 according to the present invention will be explained. If the moving picture recording button 36 is pressed down, the CPU 38 in the picture compression system switching device 30 judges the recording mode to be the moving picture recording mode to send the compression parameters for moving picture recording to the picture compression device 25. The picture compression device 25 compresses the input picture based on the compression parameters for moving picture recording and outputs the compressed picture data. The recording data generating device 26 packets the speech data outputted by the speech compression device 23 and the picture data outputted by the picture compression device 25 to supply the resulting packet data to the recording device 27. The recording device 27 records the packet data on an exchangeable recording medium 28, such as a tape, disc or a memory card. This effects recording of moving pictures.

If the still picture recording button 15 is pressed, the CPU 38 in the picture compression system switching device 30 judges the mode to be a still picture recording mode, and furnishes the compression parameters for recording still pictures to the picture compression device 25. Based on the compression parameters for recording still pictures, the picture compression device 25 compresses the input picture for one frame to output the compressed picture data. The compressed one-frame picture data is packeted by the recording data generating device 26 and furnished to the recording device 7 for recording on the exchangeable recording medium 28.

If the still picture recording button 37 is pressed down during the recording of moving pictures, the CPU 38 in the picture compression system switching device 30 switches the picture compression parameters supplied to the picture compression device 25 from those for moving picture to those for still pictures only during one-frame period. Thus, the picture compression device 25 reverts to the state of compressing the moving pictures after compressing the input picture based on the still picture recording compression parameters for one frame as from the compressed state for moving pictures. The picture data, sequentially outputted by the picture compression device, is packeted by the recording data generating device 26 and thence supplied to the recording device 27 for recording on the exchangeable recording medium 28.

Since only the compression parameters are modified for one frame period of recording still picture, even if still picture is recorded during recording the moving pictures, but the series of moving picture recording operations are not discontinued, so that still picture can be recorded without interrupting the recording of moving pictures. Consequently, the speech recording is not interrupted during recording of the moving pictures. Moreover, if the moving and still pictures are recorded simultaneously, the moving and still pictures are not recorded in separate areas, but simply the compression system for one-frame picture is modified for recording the one-frame still picture, so that the recording capacity of the recording medium can be exploited effectively without wastage. Also, since the one-frame input picture is recorded in the still picture recording mode with low picture compression ratio as an encoded frame reproducible within the frame itself, such as the intra-frame coed frame (I-picture), a still picture can be recorded to a high picture quality.

In addition, the present still/moving picture recording device 1 records on the recording medium data specifying whether the recording is by the still picture recording mode or by the moving picture recording mode, depending on whether or not the quantization coefficient of the initial macro-block of picture data is fixed at 1, so that it becomes possible to select and reproduce only the still picture data automatically.

In the configuration of FIG. 2, the picture compression system switching device 30 has the compression parameters for recording moving pictures and those for recording a still picture and the compression parameters conforming to the current recording mode are supplied from the picture compression system switching device 30 to the picture compression device 25. However, an arrangement may also be made so that compression parameters for recording moving pictures and those for recording still pictures are provided on the side of the picture compression device 25 and so that a recording mode command indicating whether the recording mode is that for the moving pictures or that for the still picture is supplied from the picture compression system switching device 30 to the picture compression device 25 which then switches the picture compression system depending on the supplied recording mode command.

An illustrative example of the still/moving picture recording/reproducing device according to the present invention will be explained by referring to FIG. 3.

Figure 3:
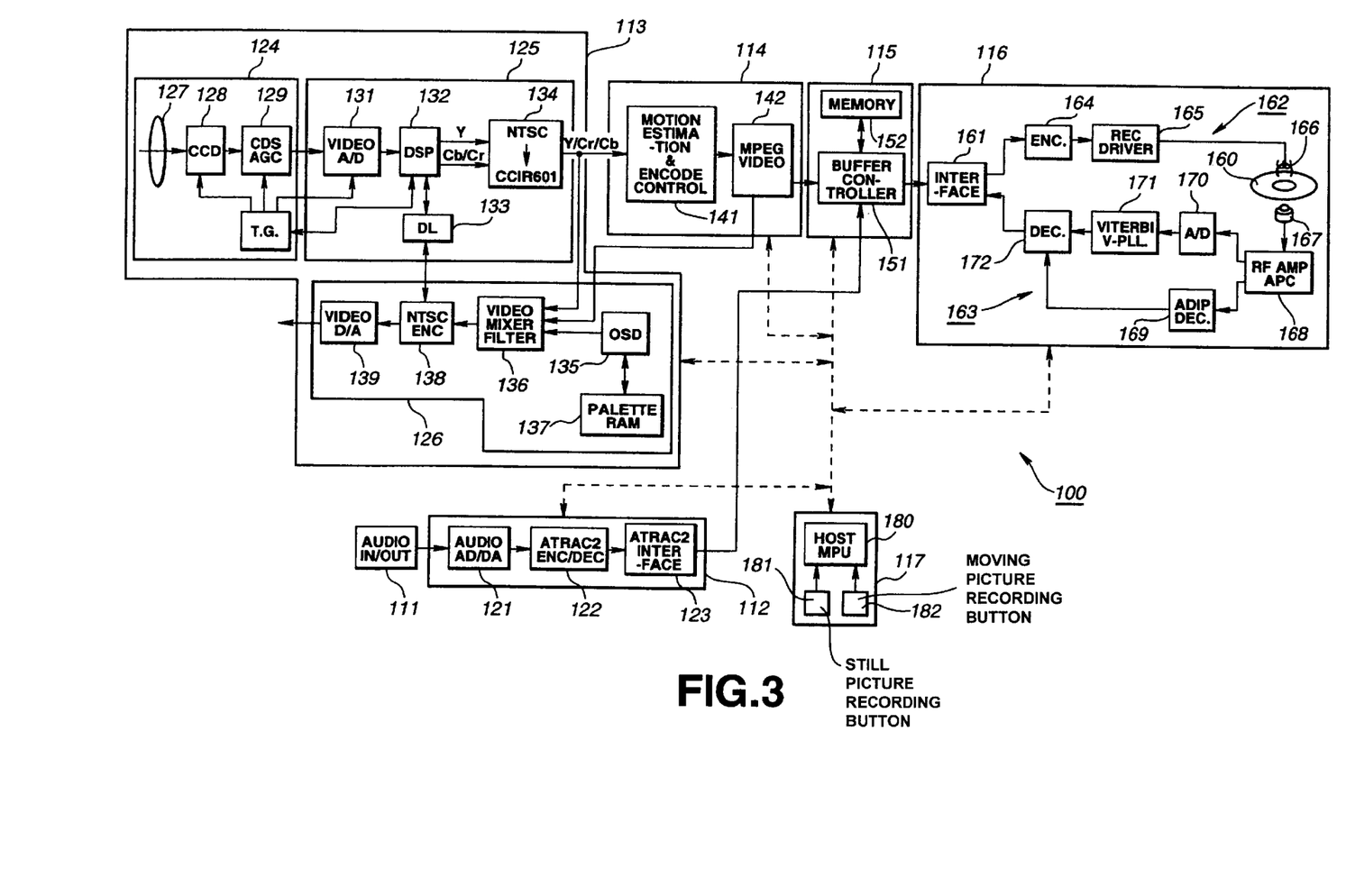
FIG. 3 is a block diagram showing a specified illustrative structure of a still/moving picture recording/reproducing device according to the present invention.

A still/moving picture recording/reproducing device 100, shown in FIG. 3, has the function of recording/reproducing speech and picture signals, and includes a speech input/output unit 111 for inputting/outputting the speech signal, a speech compression/expansion processor 112 connected to the speech input/output unit 111, a picture input/output unit 113 for inputting/outputting picture signals, a picture compression/expansion processor 114 connected to the picture input/output unit 113, a buffer memory unit 115 connected to the speech compression/expansion processor 112 and to the picture compression/expansion processor 114, a recording/reproducing unit 116 connected to the buffer memory unit 115 and a controller 117 for controlling the above components.

The speech input/output unit 111 includes an input amplifier circuit for amplifying the speech signal collected by a microphone not shown, to a pre-set level and an output amplifier for circuit for amplifying the output speech signal to a pre-set level.

The speech compression/expansion processor 112 has its operating mode switched by the controller 117 so that it operates during the recording mode for digitizing the input speech signal and subsequently high-efficiency encodes the digitized data, by way of data compression, while operating during the playback mode for expanding the compressed speech data for subsequently converting the compressed speech signals into analog signals. The speech compression/expansion processor 112 includes an AD/DA converter circuit 121, an encoding/decoding circuit 122 for compression/expansion and an interfacing circuit 123. The speech compression/expansion processor 112 has its operating mode switched by the controller 117 between an input mode and an output mode so that the compression mode and the expansion mode will be set during the input mode and during the output mode, respectively.

As the high-efficiency encoding compression system in the speech compression/expansion processor 112, two systems, namely the sub-band coding exploiting the psychoacoustic characteristics of the human auditory system (auditory masking effect and minimum audibility characteristics) or adaptive transform acoustic coding (ATRAC), are used.

In the speech compression/expansion processor 112, the AD/DA converter circuit 121 digitizes analog speech signals entered thereto via the speech input/output unit 111 during the compression mode to transmit the digital speech signals to the encoding/decoding circuit 122 for compression/expansion. Also, the AD/DA converter circuit 121 converts the digital speech signals supplied during the expansion mode from the encoding/decoding circuit 122 for compression/expansion into analog signals to output analog speech signals via the speech input/output unit 111. During the compression mode, the encoding/decoding circuit 122 for compression/expansion encodes the digital speech signals supplied thereto from the speech input/output unit 111 via AD/DA converter circuit 121 in accordance with the ATRAC2 system by way of data compression for routing the compressed speech data via interfacing circuit 123 to the buffer memory unit 115. Moreover, during the expansion mode, the encoding/decoding circuit 122 for compression/expansion decodes the compressed speech data supplied thereto via interfacing circuit 123 as an opposite operation to encoding for supplying digital speech signals to the AD/DA converter circuit 121.

The picture input/output unit 113 includes an imaging unit 124, an imaging signal processor 125 and a picture signal output processor 126 and has its operating mode switched by the controller 117 between the input mode and the output mode.

The imaging unit 124 in the picture input/output unit 113 includes an imaging lens 127 on which falls an imaging light beam, a CCD image sensor 128 for imaging an object image via imaging lens 127, an analog signal processing circuit 129 for taking out imaging signals from the CCD image sensor 128 for amplifying the imaging signal thus taken out to a pre-set level, and a timing generator 130 for supplying clock signals to the analog signal processing circuit 129. The CCD image sensor 128 is a two-dimensional color image sensor made up of, for example, 768 horizontal pixels by 494 vertical pixels, and outputs imaging signals color-coded by a color coding filter of the prime colors (R, G and B) or complementary colors (Ye, Cy and Mg). The analog signal processing circuit 129 takes out from the CCD image sensor 128 the imaging signals freed of the reset noise by correlated double sampling and amplifies the imaging signals to a pre-set level by AGC to transmit the amplified imaging signal to the imaging signal processor 125.

Meanwhile, the timing generator 130 of the imaging unit 124 generates various clocks required for driving the CCD image sensor 128, for correlative double sampling in the analog signal processing circuit 129 and for driving the imaging signal processor 125 as later explained, using the original oscillation of 14.318 MHZ (4 fsc).

The imaging signal processor 125 in the picture input/output unit 113 includes an A/D converter circuit 131 supplied with imaging signals from the imager 124, a digital signal processor 132 supplied with the digital imaging signals from the A/D converter 131, a delay circuit 133 connected to the digital signal processor 132 and a rate converter circuit 134.

The A/D converter circuit 131 digitizes the imaging signals from the imaging unit 124 and routes the resulting imaging signals to the digital signal processor 132. The digital signal processor 132 decodes the digital imaging signals supplied from the imager 124 via A/D converter 131 in association with the color coding by the color coding filter of the CCD image sensor 128, using a delay circuit 133, for regenerating the luminance signal Y and the chroma signal Cr/Cb pursuant to the NTSC system. The rate convertor circuit 134 executes rate conversion of changing over the sampling frequency of the luminance signal Y and the chroma signal Cr/Cb board generated by the digital signal processor 132 from 14.318 MHZ to 13.5 MHZ for generating the luminance signal Y and the chroma signal Cr/Cb pursuant to CCIR601.

In the picture input/output unit 113, the imaging unit 124 and the imaging signal processor 125 operate during the input mode. The imaging signal processor 125 generates, from the imaging signals generated by the imaging unit 124, the digital picture signals Y/Cr/Cb pursuant to the CCIR601, and outputs the signal Y/Cr/Cb to the picture signal output processor 126 and to the picture compressing/expansion processor 114.

The picture signal output processor 126 of the picture input/output unit 113 includes a mixer circuit 136, fed with the digital picture signals Y/Cr/Cb generated by the imaging signal processor 125, pursuant to CCIR601, digital picture signals Y/Cr/Cb generated by the picture compression/expansion processor 114 as later explained, pursuant to CCIR601, and a tube surface display signal generated by a tube surface display signal generating circuit 135. The picture signal output processor 126 also includes a palette RAM 137 connected to the tube surface display signal generating circuit 135, an NTSC encoding circuit 138 connected to the mixer circuit 136 and a D/A converter circuit 139 connected to the NTSC encoding circuit 138.

The mixer circuit 136 of the picture input/output unit 113 is used for superimposing a tube surface display signal generated by the tube surface display signal generating circuit 135 on the digital picture signals Y/Cr/Cb, pursuant to CCIR601, generated by the picture signal processor 125 or the picture compression/expansion processor 114. The NTSC encoding circuit 138 encodes the digital picture signals Y/Cr/Cb pursuant to CCIR601 supplied by the picture signal processor 125 or the picture compression/expansion processor 114 via mixer circuit 136 to digital picture signals pursuant to NTSC to transmit the resulting digital picture signals to the D/A converter circuit 139. The D/A converter circuit 139 converts the digital picture signals supplied from the NTSC encoding circuit 138 into analog picture signals which are outputted to for example a monitor device, not shown.

The picture compression/expansion processor 114 has its operating mode changed over by the controller 117 so that it operates as a data compression device of high-efficiency encoding or compression for the recording mode, by way of data compression, while operating as a data expansion device of expanding the compressed picture data during the playback mode. The picture compression/expansion processor 114 is made up of a motion detection circuit 141 and an encoder/decoder circuit 142 for compression/expansion and has its operating mode changed over by the controller 117 to an input mode or to an output mode or vice versa such that the compression mode and the expansion mode are set for the input mode and for the output mode, respectively.

As the high-efficiency encoding compression system in the picture compression/expansion processor 114, the MPEG (Moving Picture Experts Group) 2 system exploiting correlation of picture signals is used. With the MPEG2 system, the inter-frame difference of picture signals is taken for lowering redundancy along the time axis and subsequently the orthogonal transform technique such as discrete cosine transform is used for lowering redundancy along the spatial axis for high-efficiency encoding the video signals. With the MPEG system, a group consisting of a number of moving pictures is termed a group-of-pictures (GOP) and picture reproduction is carried out on the GOP basis. The pictures in a GOP are roughly classified into an I-picture, a P-picture and a B-picture, with the picture signals of each frame being encoded as one such picture type.

In the picture compression/expansion processor 114, the encoder/decoder circuit 142 for compression/expansion encodes the digital picture signals Y/Cr/Cb pursuant to CCIR601, supplied from the picture input/output unit 113 via motion detection circuit 141 for the compression mode, in accordance with the MPEG2 system, by way of data compression, for generating compressed picture data, which is then supplied to the buffer memory unit 115. The amount of generated bits is fed back from the encoder/decoder circuit 142 to the motion detection circuit 141 for effecting rate control. Picture data is compressed under the picture compression conditions designated by the compression parameters supplied from the controller 117. The encoder/decoder circuit 142 for compression/expansion decodes the compressed picture data from the buffer memory unit 115 as a counterpart operation to encoding for generating digital picture signals Y/Cr/Cb pursuant to CCIR601 for supplying the generated picture signals to the mixer circuit 136 of the picture input/output unit 113. The amount of generated bits is fed back from the encoder/decoder circuit 142 to the motion detection circuit 141 for effecting rate control.

The buffer memory unit 115, used for transiently storing compressed speech data and compressed picture data recorded/reproduced by the recording/reproducing unit 116, is made up of a buffer controller 151 and a cache memory 152 and is switched between the input and output modes by the controller 117.

If the input mode is set by the controller 117, the buffer controller 151 of the buffer memory unit 115 transiently stores compressed speech data supplied from the speech compression/expansion processor 112 and compressed picture data supplied from the picture compression/expansion processing unit 114 in the cache memory 152 and packets the compressed speech data and the compressed picture data to form packet data which is supplied to the recording/reproducing unit 116. If the output mode is set by the controller 117, the buffer controller 151 transiently stores the packet data from the recording/reproducing unit 116 in the cache memory 152 for separately supplying the compressed speech data and the compressed picture data to the speech compression/expansion processor 112 and to the picture compression/expansion processor 114, respectively.

The recording/reproducing unit 116 records/reproduces picture and speech data, using a magneto-optical disc 160, having a double spiral track as proposed in our co-pending Japanese Patent Applications Nos. 8-67880 or 9-142664, as a recording medium. The recording/reproducing unit 116 includes a recording unit 162 and a reproducing unit 163, connected via an interfacing circuit 161 to the buffer memory unit 115, and has its operating mode changed over by the controller 117.

In the recording/reproducing unit 116, the recording unit 162 includes a recording encoder 164, fed with the packet data from the buffer memory unit 115 via interfacing circuit 161, a recording driver 165 driven by an output of the recording encoder 164 and a magnetic head 166 excited by the recording driver 165. The reproducing unit 163 is made up of an optical head 167 arranged facing the magnetic head 166 with the magneto-optical disc 160 inbetween, a playback amplifier 168 connected to the optical head 167, an A/D converter 170 and an ADIP decoder 169, fed with playback signals by the optical head 167 via playback amplifier 168, a viterbi decoding circuit 171 fed with an output of the A/D converter circuit 170, and a playback decoder 172 fed with outputs of the address in pre-groove decoder (ADIP decoder) 169 and the viterbi decoding circuit 171.

By the recording mode being set by the controller 117 for the input mode in the recorder 162 in the recording/reproducing unit 116, the packet data from the buffer memory unit 115 is fed to the recording encoder 164 via interfacing circuit 161. By the packet data being modulated and by the resulting modulated output driving the recording driver 165, the recording encoder 164 energizes the magnetic head 166 in keeping with packet data. In the recording/reproducing unit 116, the laser light illuminated on the magneto-optical disc 160 from the optical head 167 of the reproducing unit 163 arranged facing the magnetic head 166 with the magneto-optical disc 160 in-between is switched for the recording mode to the recording light volume for raising the temperature of the magneto-optical recording layer of the magneto-optical disc 160 to the Curie temperature by laser light illumination. Under this condition, the magnetic head 166 is energized for magnetic field modulation recording the packet data on the magneto-optical recording layer of the magneto-optical disc 160.

By the playback mode being set for the output mode in the playback unit 163 in the recording/reproducing unit 116 by the controller 117, the laser light illuminated from the optical head 167 to the magneto-optical disc 160 is switched to the playback light volume. The optical head 167 radiates the laser light of the playback light volume to the magneto-optical recording layer of the magneto-optical disc 160 and detects the reflected light for reproducing the playback signal. The playback signals generated by the optical head 167 are supplied via playback amplifier 168 to the A/D converter circuit 170 and to the ADIP decoder 169. The playback signals supplied to the A/D converter circuit 170 are digitized and viterbi-decoded by the viterbi decoding circuit 171 to give playback data. The viterbi decoding circuit 171 furnishes the viterbi-decoded playback data to the reproducing decoder 172. The ADIP decoder 169 decodes the address information recorded as ADIP signal by for example bi-phase modulating the wobbling of the groove of the magneto-optical disc 160 from the playback signals and furnishes the decoded address information to the reproducing decoder 172. The playback decoder 172 demodulates the playback data in association with the encoding performed by the recording encoder 164 of the recording/reproducing unit 116 for reproducing the packet data which is supplied via interfacing circuit 161 to the buffer memory unit 115.

The controller 117 is comprised of a micro-processor 180 and operates as a system controller for switching the operation of the speech compression/expansion processor 112, picture input/output unit 113, picture compression/expansion processing unit 114, buffer memory unit 115 and the recording/reproducing unit 116.

Figure 4:
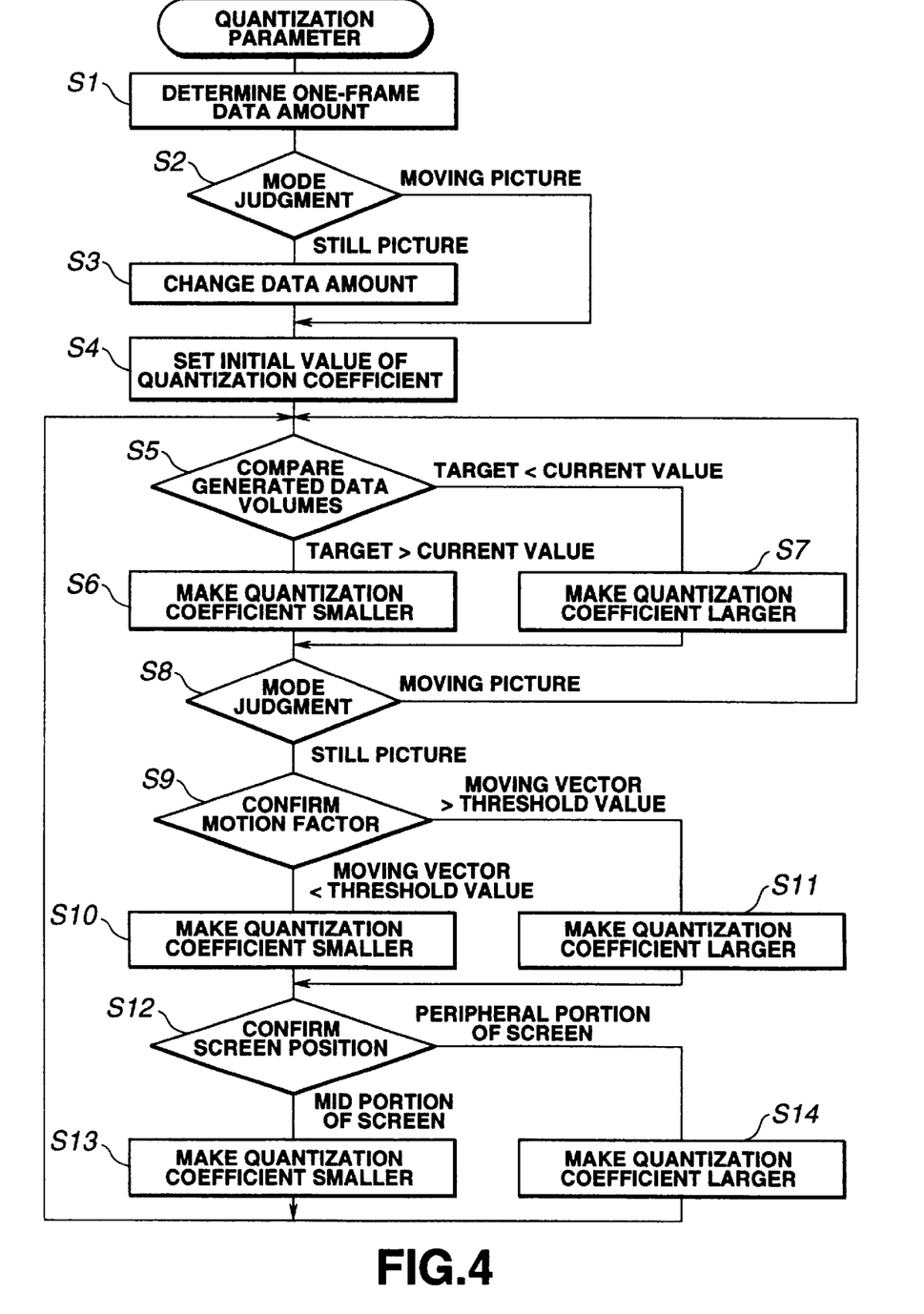
FIG. 4 is a flowchart for illustrating a sequence of operations for determining quantization parameters supplied to a picture compression/expansion processor by a controller of the still/moving picture recording/reproducing device shown in FIG. 3.

The micro-processor 180 in the controller 117 accepts an operating input of a still picture recording button 181 or a moving picture recording button 182 to switch between the still picture mode and the moving picture mode and determines the picture compression parameters, that is quantization parameters, supplied to the picture compression/expansion processor 114, in accordance with the flowchart shown in FIG. 4.

That is, the micro-processor 180 of the controller 117 determines the data volume allocated to a frame at step S1 as follows: That is, if rate control is executed on the GOP basis, the total number of GOP-based data is found from the bit rate and the data volume so far used is subtracted from the total number of data to find the residual data volume. The numbers of the residual I-, P- and B-pictures are then found for setting data allocation. Finally, the data volume is determined in accordance with the frame compression method (I, P and B).

At the next step S2, it is judged whether the operating mode is the still picture mode or the moving picture mode. If the mode is the still picture mode, the data volume is increased in an amount designated at step S3. Then, processing transfers to step S4. If the mode is the moving picture mode, processing transfers directly to step S4.

At step S4, the initial value of the quantization coefficient is set as follows: That is, the data volume as found is divided by the total number of macro-blocks to set the data rate as an initial value of the quantization coefficient.

At the next step S5, it is judged whether or not the current value of the generated data volume is smaller than a target value. If the current data rate is smaller than the target value, processing transfers to step S6 to lessen the quantization coefficient. If the current data rate is larger than the target value, processing transfers to step S7 to enlarge the quantization coefficient.

At the next step S8, it is judged whether the operating mode is the still picture mode or the moving picture mode. If the mode is the moving picture mode, processing reverts to step S5 to judge again whether or not the current value of the generated data volume is smaller than the target value.

At the next step S9, it is judged whether or not the motion vector is larger than a threshold value. If the motion vector is smaller than the threshold value, processing transfers to step S10 to lessen the quantization coefficient. If the motion vector is larger than the threshold value, processing transfers to step S11 to enlarge the quantization coefficient.

At the next step S12, it is judged whether a block in subject is in a pre-set mid portion on the screen or in any other peripheral portion. If the block is in the mid portion of the screen, processing transfers to step S13 to lessen the quantization coefficient. If the block is in the peripheral portion of the screen, processing transfers to step S14 to enlarge the quantization coefficient. Then, processing reverts to Step S5 or judge again whether or not the current value of the generated data volume is smaller than the target value.

With the present still/moving picture recording/reproducing device 100, in which the compression parameters for recording moving and still pictures are adaptively determined and the compression parameters conforming to the recording mode are supplied from the controller 117 to the picture compression/expansion processor 114 for preferentially allocating the information volume to a target desired to be imaged for thereby improving the picture quality of the still picture.

What is claimed is:

1. A still/moving picture recording apparatus comprising:
   picture compression means for generating, for a moving picture recording mode, picture data compressed based on compression parameters for moving picture recording, and for generating, for a still picture recording mode, compressed picture data compressed based on compression parameters for still picture recording; and recording means for recording picture data generated by said picture compression means on an exchangeable recording medium, wherein picture data inclusive of the still picture recording mode information specifying that the picture is a still picture is recorded on said recording medium for the still picture recording mode, and wherein said compression parameters for the still picture provide that, in compression encoding the compression parameters for still picture in accordance with MPEG as the standard for encoding, the quantization coefficient of the first macro-block of the picture data be fixed at a pre-set specified value, and wherein the information in which the quantization coefficient of the first macroblock of the picture data is fixed at the pre-set specified value is utilized as the still picture recording mode information.

2. A still picture recording method:

wherein, for a moving picture recording mode, picture data compressed based on compression parameters for moving picture recording is generated for recording on a recording medium, wherein, for a still picture recording mode, picture data compressed based on compression parameters for still picture recording is generated based for recording on the recording medium along with the still picture recording mode information specifying that the picture recorded in a still picture, and wherein the compression parameters for still picture provide that, in compression encoding by MPEG as a standard for encoding, the quantization coefficient of the initial macro-block of picture data be fixed at a pre-set specified value, and wherein the information in which the quantization coefficient of the initial macro-block of picture data is fixed at the pre-set specified value is used as the still picture recording mode information.

* * * * *